(12) United States Patent
Alkouh

(10) Patent No.: US 7,227,544 B2
(45) Date of Patent: *Jun. 5, 2007

(54) IMAGE DATA PROCESSING USING DEPTH IMAGE DATA FOR REALISTIC SCENE REPRESENTATION

(75) Inventor: Homoud B. Alkouh, San Diego, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/379,370

(22) Filed: Apr. 19, 2006

(65) Prior Publication Data

US 2006/0181549 A1    Aug. 17, 2006

Related U.S. Application Data

(63) Continuation of application No. 10/120,324, filed on Apr. 9, 2002, now Pat. No. 7,081,892.

(51) Int. Cl.
   *G06T 15/00* (2006.01)
(52) U.S. Cl. .................................................. 345/419
(58) Field of Classification Search ...................... None
   See application file for complete search history.

(56) References Cited

U.S. PATENT DOCUMENTS

| 5,596,686 | A | * | 1/1997 | Duluk, Jr. ................... 345/422 |
| 5,929,862 | A | * | 7/1999 | Barkans ...................... 345/613 |
| 6,097,393 | A | * | 8/2000 | Prouty et al. ............... 345/419 |
| 6,445,833 | B1 | * | 9/2002 | Murata et al. .............. 382/285 |
| 6,571,020 | B1 | * | 5/2003 | Dumoulin et al. .......... 382/254 |
| 6,590,574 | B1 | * | 7/2003 | Andrews ..................... 345/419 |
| 6,593,922 | B1 | * | 7/2003 | Shimono .................... 345/419 |
| 6,646,687 | B1 | * | 11/2003 | Vlahos ........................ 348/586 |
| 6,897,880 | B2 | * | 5/2005 | Samra ......................... 345/619 |
| 6,956,576 | B1 | * | 10/2005 | Deering et al. ............. 345/475 |
| 2001/0014175 | A1 | * | 8/2001 | Tavor .......................... 382/167 |

* cited by examiner

*Primary Examiner*—Mark Zimmerman
*Assistant Examiner*—Enrique L. Santiago
(74) *Attorney, Agent, or Firm*—Martine Penilla & Gencarella, LLP

(57) ABSTRACT

A method for processing video image data for display during interactive game play is provided. During a game play session, processing of one or more images of the game play session is performed to adjust scene representation of objects at a first distance relative to objects at a second distance. During the game play session, the method generates a sharp image for a scene and produces a blur image of the scene. The method then generates a composited blend image of the sharp and blur images using data from z-dimension image data. The composited blend image has depth of field information provided by the z-dimension image data, and then rendering of the scene for display during the interactive game play. The method then repeats for the one or more images during the game play session.

18 Claims, 16 Drawing Sheets

IMAGE DATA PROCESSING USING DEPTH IMAGE DATA FOR REALISTIC SCENE REPRESENTATION

CROSS REFERENCE TO RELATED APPLICATIONS

This application is a continuation application that claims priority from U.S. application Ser. No. 10/120,324, entitled IMAGE WITH DEPTH OF FIELD USING Z-BUFFER IMAGE DATA AND ALPHA BLENDING, filed on Apr. 9, 2002 now U.S. Pat. No. 7,081,892, which is herein incorporated by reference.

BACKGROUND

1. Field of the Invention

This invention relates generally to computer graphics and, more particularly, to computer-produced display images with enhanced realism.

2. Description of the Related Art

Computers are being used to depict "virtual reality" worlds that do not exist anywhere except in a three-dimensional space maintained by the computer. Objects can "exist" in the virtual reality world and can move about in the coordinate space of the virtual reality. Such worlds are quite useful for simulations of real-world events where it is not practical to use real objects, such as laboratory investigations and event simulations, and are useful for entertainment purposes such as computer games and cinematic works (animation). The field of computer graphics strives to provide images depicting a computer's virtual reality world with greater realism.

A computer display image is specified as a combination of picture elements, each of which is called a pixel. The pixels in a display image specify a combination of red, blue, and green color information, much like a conventional television image is specified. Each pixel is associated with data specifying color intensity information for each red, blue, and green pixel of the image. The color intensity data is typically represented by an 8-bit data word. Most virtual reality simulations represent objects in a scene as data objects that have associated characteristics such as shape, size, position, and color. When an object is to be drawn, or rendered, on the computer display, a graphics processor determines an appropriate mixture of red, blue, and green pixel information for depiction of the image and generates video information for the correct mixture of red, blue, and green colors for each pixel. Display devices may have different-sized pixels with which images are produced. Many computer flat panel displays, for example, may have individual circular pixels each having a diameter of approximately 0.29 mm (0.0116 inch).

A computer graphics processor or display processor provides picture rendering processing for a computing device so that images created by a computer application program or other source of computer-generated pictures will be properly displayed. Computer graphics involves the creation, storage, and manipulation of models and images of objects based on pictorial synthesis of the objects from computer-based models. The creation, storage, and manipulation of the objects may occur in real time and may be an interactive process involving a computer user with an input device such as a keyboard, display mouse, controller, or touch-screen display panel. An important part of the picture rendering process involves image processing, in which the position and movement of objects in the images are carefully reproduced in two-dimensional and three-dimensional space.

For example, to determine what objects are being represented and what will be visible in the rendered or drawn image, a graphics processor maintains position information for all the pixels in a scene, representing the points of an object in the computer-drawn scene. Some of the position information is maintained in the form of a z-buffer for the image. The z-buffer for an image or frame of a scene is a set of data values, one data value for each pixel in the image, based on coordinates that determine the position of an object in the scene. That is, the z-buffer data is used to specify how far a pixel of an object is from the camera perspective. Thus, there is one z-buffer data entry for each pixel in a display image, and the graphics processor will maintain the data that specifies the position of that pixel in the computer model.

Each z-buffer data point may be represented by a data word, such as a 32-bit data word. See, for example, Section 1.5, "Hidden surface removal algorithm" at p. 22 in Advanced Animation and Rendering Techniques by A. Watt and M. Watt (ACM Press, 1992). The fidelity and detail of the computer image depends in part on the ability of the graphics processor to perform the necessary mathematical calculations on the object position information embodied in the z-buffer, and commercially available graphics processors are being continuously improved with respect to their mathematical processing capabilities and other image-processing power.

Computer-drawn virtual reality images typically have a different appearance from real images (such as photographs or video frames) of actual objects. One of the reasons for the discrepancy between computer images of virtual reality and images of actual physical objects is that virtual reality images do not realistically show expected depth of field information. Generally, depth of field refers to the changing amount of detail the human eye expects to perceive for objects in an image, depending on whether an object is close or far away from the viewer's perspective. For example, objects in a photograph that are farther away from the viewer's perspective will have fewer discernible image details and will be less distinct than objects that are closer to the viewer. Thus, far away objects have a "fuzzy" look and are not as sharp and clear as close up objects.

One of the reasons for the "cartoonish" appearance of most virtual reality images is because close up objects in the images typically are not sharper and have no more detail than far away objects, and far away objects do not appear any more fuzzy than close up objects. In other words, depth of field is constant throughout the virtual reality image. This is contrary to the appearance of "real world" images. Thus, a cartoon appearance results when discernible details of an object do not change in the expected manner when the object is closer or farther away in the image. A more realistic appearance would require close objects to have more detail and be sharper than objects that are farther away.

Some techniques have been used to provide enhanced depth of field information in computer image displays. For example, a stochastic sampling technique is used in distributed ray tracing to integrate depth of field information in a pre-rendered computer generated image. Another post-processing technique uses pixel intensity and z-buffer image depth data to determine the size and intensity distribution of the circle of confusion for each image point as it relates to its z-buffer value and the lens aperture being used. The intensity of each point in the output image is calculated as a weighted average of the intensities in the circles of confusion that overlap at each point. This technique is described by Potmesil and Chakravarty, referenced in *Computer Graphics: Principles and Practice*, Second Edition in C, by J. Foley et al. (Addison-Wesley Publishing Company, Inc., 1996) in Section 16.10 at 774–775. These techniques, however, are post-processing techniques and are not used to render images in a real time process. Thus, they are not suitable for any interactive use.

From the discussion above, it should be apparent that there is a need for realistic computer-drawn images with enhanced depth of field information. The present invention fulfills this need.

SUMMARY OF THE INVENTION

The present invention provides a display image with improved depth of field representation of a three-dimensional scene by combining a sharp image of the scene corresponding to an in-focus representation with a blur image representation of the scene, and then producing an alpha blend between the sharp and blur images by compositing the sharp and blur images according to z-buffer data, which is ordinarily used by graphics processors for hidden surface removal. In this way, the image data from the z-buffer is used as an alpha channel and is blended with color channel data of the sharp and blur images to produce an alpha channel data (RGBA image) image having depth of field information. This provides a more realistic image representation of the scene that is sharper for objects at one distance and less distinct for objects at another distance, and with less saturation in the background areas of the image.

Other features and advantages of the present invention should be apparent from the following description of the preferred embodiments, which illustrate, by way of example, the principles of the invention.

DETAILED DESCRIPTION

The present invention is described in the context of an example display environment that utilizes conventional computer display color models for the representation of scenes. The example environment is used for purposes of description only. It is not intended that the invention should be limited to this example environment. Those skilled in the art will appreciate that the details of the example environment may be applied to other graphics processing environments without departing from the teachings of this invention.

Figure 1:
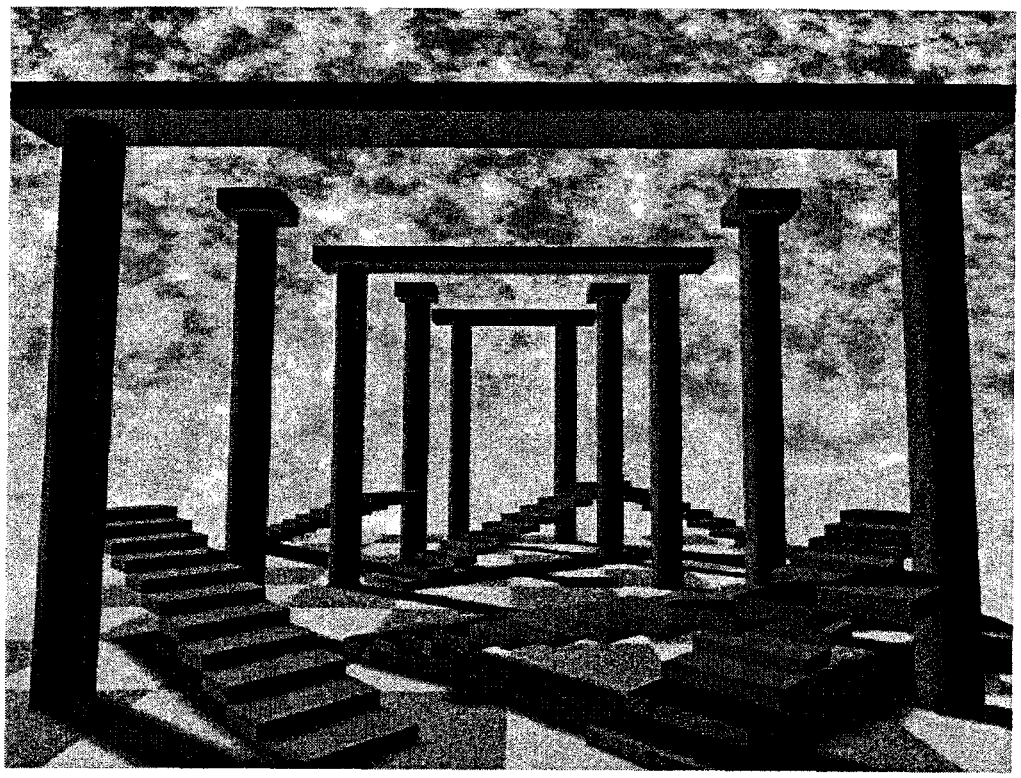
FIG. 1 is computer display image of a scene, showing an infinitely sharp image such as may be produced from a graphical rendering process of the computer.

FIG. 1 is computer display image of a computer-generated scene, showing an infinitely sharp image such as may be produced from a conventional computer graphics rendering process. It should be noted that FIG. 1 shows a staircase scene image that is infinitely sharp and in focus, so that the staircases in the foreground (closest to the viewer in the image) are just as sharp as the staircases in the background (farther away from the viewer). Likewise, the columns in the scene are just as sharp close by, to the front of the scene, as they are farther away. This is characteristic of many computer rendered images and results in an appearance that is characterized as "cartoonish."

More particularly, a typical animation scene or other computer-drawn image has infinite sharpness, though a photographic image (and what is seen with actual vision) typically does not have infinite sharpness. The present invention can produce a more realistic image, using no more visual information than the initial infinitely sharp image, such that an image produced in accordance with the invention includes depth of field information and can show changing focus or differing sharpness of objects in the scene, the change in focus depending on the image distance of objects in the scene to the viewer. In this way, individual images from a sequence of images may be processed to add accurate depth-of-field image processing. Thus, a sequence of animation scenes may be processed, one after the other, so that an entire animation sequence can be made more realistic looking. In addition, the image processing in accordance with the invention, as described further below, can be performed in a real-time rendering environment, thereby supporting interactive graphics processing with improved depth-of-field representations.

Figure 2:
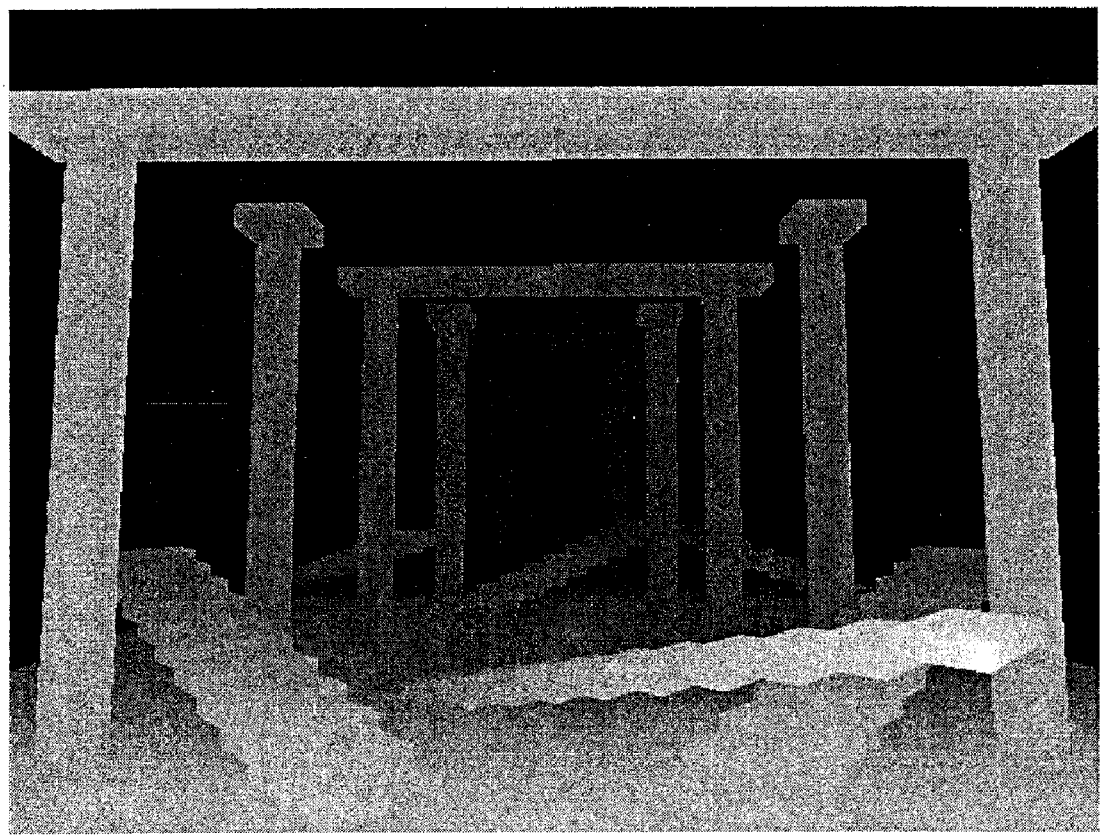
FIG. 2 is a computer display image of the scene from FIG. 1, showing an 8-bit representation of z-buffer data for the scene.

FIG. 2 is a computer display image of the scene from FIG. 1, showing an 8-bit representation of z-buffer data for the scene. As noted above, most computer graphics displays of three-dimensional objects in a virtual reality world are rendered using a z-buffer data store that tracks distance from each object in the virtual reality world to the viewer, or camera perspective. For example, FIG. 2 shows z-buffer data in which each pixel in the image is made darker as the distance to the user (camera perspective) is made greater. Thus, close objects are brighter and distant objects are darker. The z-buffer data comprises position information for objects in the scene. Such data is typically maintained with a resolution that is consistent with the arithmetic processing power of the graphics processor, often comprising 64-bit or even 128-bit computing power. As described further below, the present invention contemplates using the z-buffer data to process pixel data, which typically is maintained with a video display resolution of eight bits per pixel. The present invention is suitable for use with a wide variety of computing platforms, including game consoles, Personal Computers, and workstations. An extraordinary amount of computing power is therefore not necessary to implement the invention on a computing platform.

Figure 3:
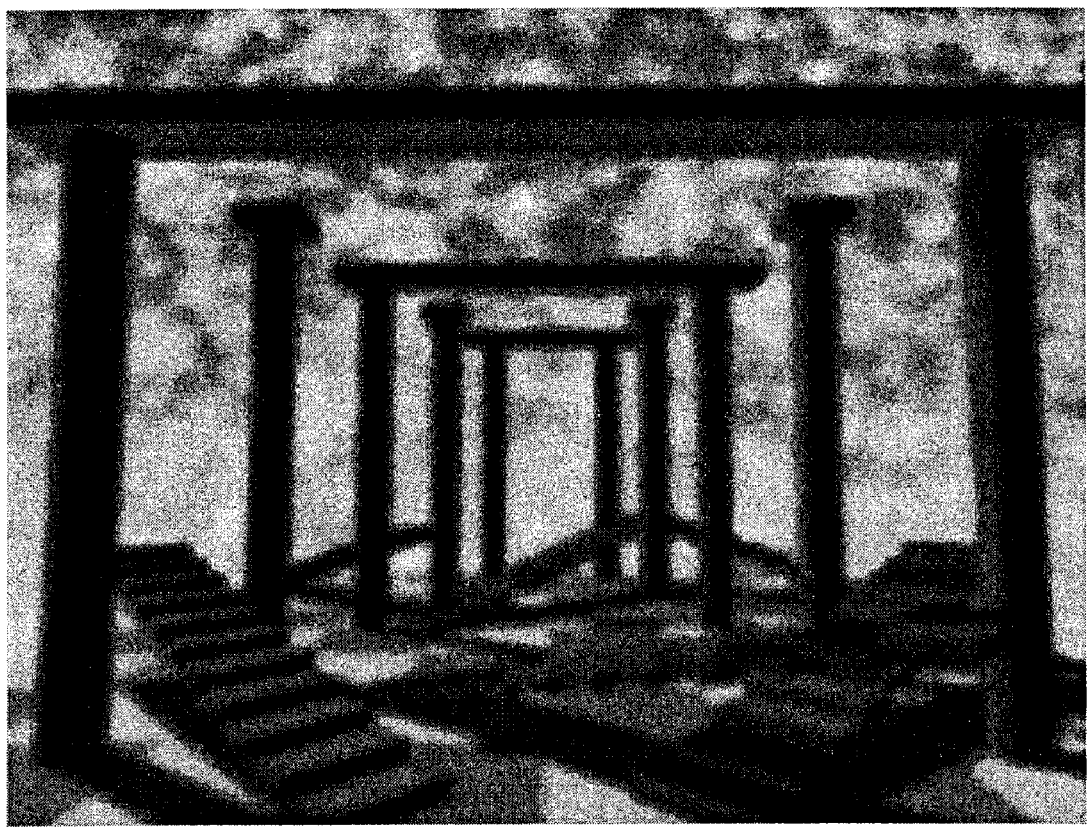
FIG. 3 is a computer display image of the scene from FIG. 1, showing a blur image version of the FIG. 1 infinitely sharp scene.

FIG. 3 is a computer display image of the scene from FIG. 1, showing a blur image of the FIG. 1 scene. FIG. 3 can be produced starting only with data representing the scene of FIG. 1. The FIG. 3 blur image may be produced, for example, through a process called MIP-mapping, or by shifting the sharp image onto itself with a predetermined shifting. For example, the blur image may be produced by an off-screen pasting process that pastes the sharp image onto itself with a one-pixel offset in both the horizontal and vertical directions. Other means of providing a blur image will occur to those skilled in the art. The MIP-mapping operation, for example, involves a texture mapping technique in which a graphics processor makes multiple copies (MIP-maps) of an original drawing texture for an object in a scene, at various levels of detail, and then selects a MIP-map in accordance with the distance from the viewer to the object.

After the sharp image (FIG. 1) and the blur image (FIG. 3) for the scene to be processed are obtained, the z-buffer data that is ordinarily used by the graphics processor of the computer display system is utilized. As noted above, the z-buffer ordinarily is used in a computer image processing environment for hidden surface removal, which is also referred to as visible surface determination. The z-buffer contains distance data for each pixel of an image to be rendered. Hidden surface removal involves making a determination, when an object in a computer-generated scene is being rendered, whether each point on the object is located at an image pixel location relative to the viewer that is farther than the current distance for that pixel in the z-buffer. If a point on the object is farther from the current z-buffer value for that pixel location, then that object pixel point will not be visible in the rendered image and will not be drawn by the graphics processor.

The z-buffer hidden surface removal processing technique is described, for example, in *Computer Graphics: Principles and Practice*, second edition (1996), by J. Foley et al. (Addison-Wesley Publishing Company, Inc.) in Section 15.4 ("The z-Buffer Algorithm") at 668–672.

The present invention utilizes the z-buffer pixel distance data and creates what is called an alpha blend image, combining the sharp image and blur image with an image created from the z-buffer data. Those skilled in the art will understand that a computer display image is typically produced by combining three color channels of information with an alpha channel of information. The color channels comprise red, green, and blue pixel image data that represent the color information of the scene. The alpha channel ($\alpha$ channel) of data represents the opacity of the image pixels, ranging from completely opaque to transparent. In most processing systems and color models, each of these four image data channels is represented by eight bits of information for each pixel.

Those skilled in the art will be familiar with the technique of compositing an image through an "alpha blending" operation. The alpha channel opacity data is used to control the blending of red, green, and blue image components to produce an "alpha blended" image with the proper translucency values. That is, in a conventional system, the red, green, and blue color channels of image information are composited together, along with the alpha channel opacity information, producing what is referred to as an RGBA color information model. Thus, a scene is completely described for purposes of rendering by a graphics processor by specifying the red, green, and blue image information and the alpha-channel information for each pixel.

The alpha blending compositing process is described, for example, in *Computer Graphics: Principles and Practice*, second edition (1996), by J. Foley et al. (Addison-Wesley Publishing Company, Inc.) in Section 17.6 ("Image Compositing") at 835–843. Another description of a compositing process is described in U.S. Pat. No. 5,379,129 to Othmer et al., "Method for Compositing a Source and Destination Image Using a Mask Image".

The present invention involves a compositing process with the sharp image, blur image, and z-buffer data, using the z-buffer data as an alpha channel to control the blending of the sharp image and the blur image. More particularly, the z-buffer data is used to determine the translucency of the blur image according to the distance of each pixel from the viewer's perspective. In the preferred embodiment, for every black (opaque) pixel in the z-buffer, the complete (100%) value of the blur image data is used for compositing with the sharp image. For every white (transparent) pixel of the z-buffer, none (zero percent) of the blur image is composited with the sharp image. For pixels in shades of gray in between 100% and 0%, a corresponding proportional percentage of the sharp and blur images are composited together. Thus, linear interpolation is used to determine the percentage of the one image to be composited with the other. In this way, the z-buffer data of the scene image is being used as a depth-of-field alpha channel.

Figure 4:
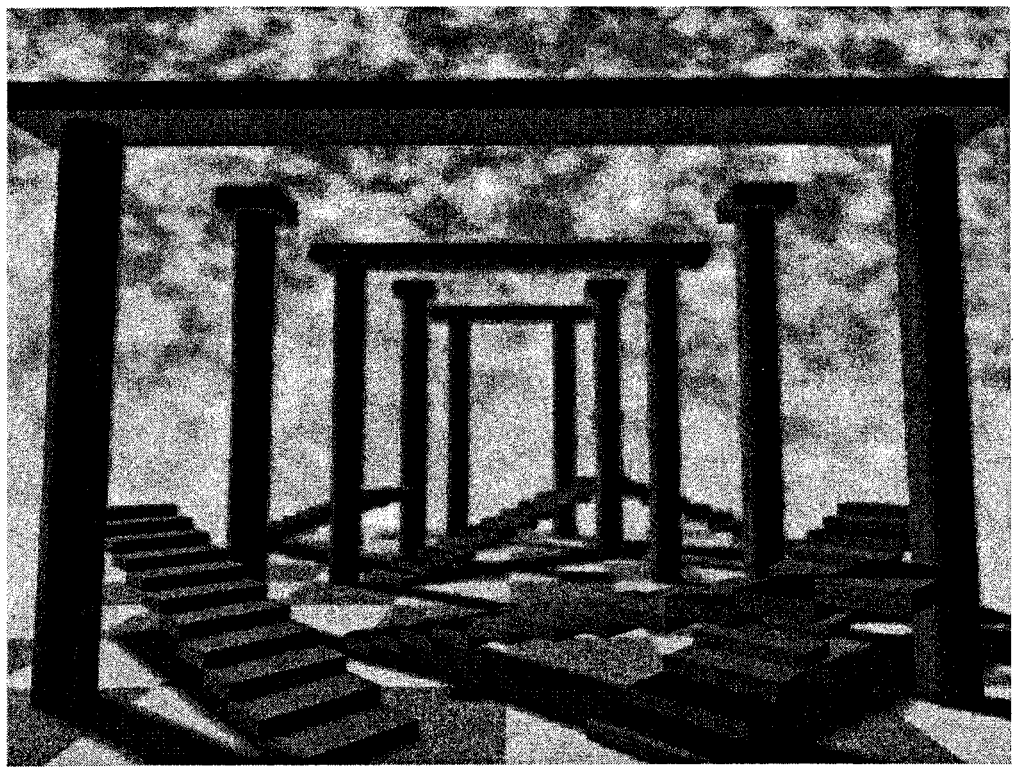
FIG. 4 is a computer display image of the infinitely sharp scene from FIG. 1, showing an alpha blend of the sharp image from FIG. 1 and the blur image of FIG. 3 using the z-buffer image data from FIG. 2 as an alpha channel.

FIG. 4 is a computer display image of the scene from FIG. 1, showing the result of alpha blending of the infinitely sharp image from FIG. 1 and the blur image of FIG. 3 using the z-buffer image data as an alpha channel, in accordance with the invention. A conventional alpha blending process can be used to produce the blended image in accordance with the invention, by selecting for the compositing process a combination of sharp image, blur image, and z-buffer data. It should be noted that FIG. 4 shows an image with the staircases in the foreground sharp and distinct, while the staircases in the background (farther from the viewer) are not as sharp and distinct, but are rather fuzzy. This is more realistic and more similar to the depth of field observed in typical photographs of real scenes.

Figure 5:
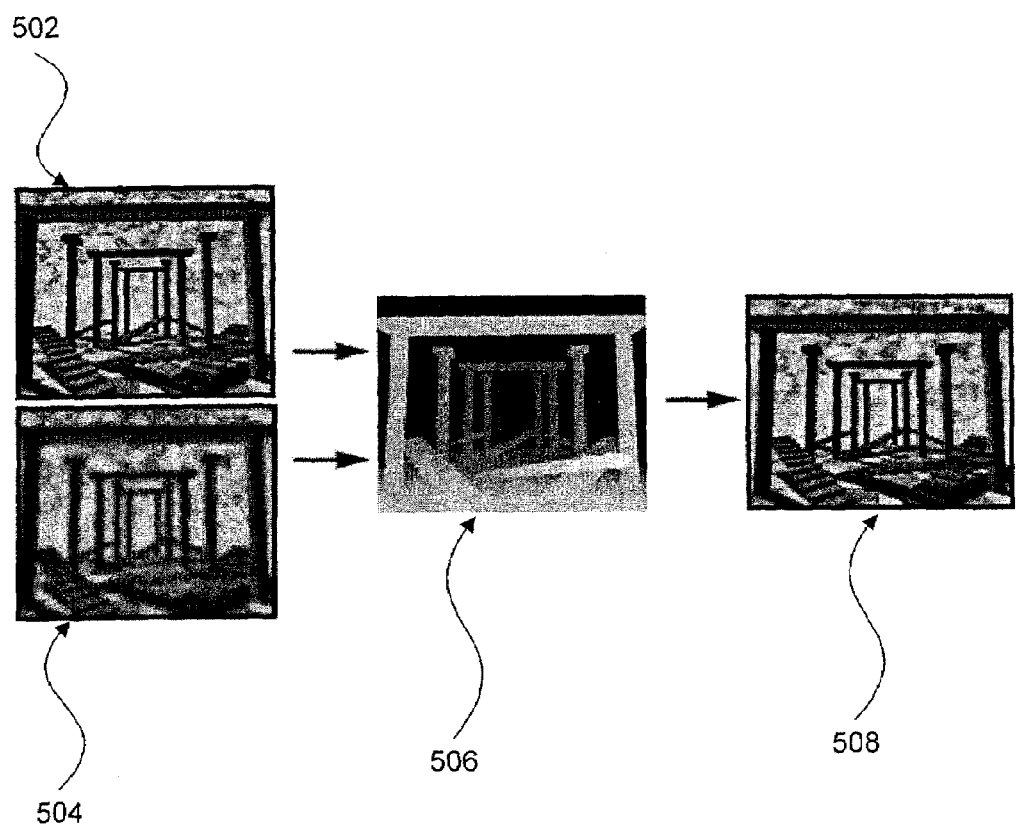
FIG. 5 is a graphical depiction of the blending of the FIG. 1 infinitely sharp image and the FIG. 3 blur image using the FIG. 2 z-buffer image data for alpha blending.

FIG. 5 is a graphical depiction of the blending of the FIG. 1 infinitely sharp image and the FIG. 3 blur image using the FIG. 2 z-buffer image data for control of the blending. Thus, FIG. 5 depicts the infinitely sharp image 502 of FIG. 1 and the blur image 504 of FIG. 3 being combined (composited) with the 8-bit z-buffer image 506 of FIG. 2, producing the image 508 of FIG. 4 with depth-of-field information added.

A "reverse" depth of field image can easily be created using the same technique of the present invention. A reverse image as used herein refers to an image in which objects in a scene that are closer to a viewer are more fuzzy and less distinct, while objects that are farther from the viewer are sharper and more distinct. This is the opposite of what is typically observed in photographs and therefore will be referred to as a reverse depth of field image.

A reverse depth of field image may be easily created by utilizing a reverse z-buffer data set. That is, reverse z-buffer data will be produced when z-buffer pixels that are black (opaque) are changed to white (transparent), and z-buffer pixels that are white are changed to black. Intermediate gray shades are changed accordingly, to be similarly reversed. When the reverse depth of field data is composited with the sharp and blur image, a reverse scene image is produced. Those skilled in the art will appreciate that the intermediate values of the reverse image may be determined by linear interpolation of the z-buffer values being changed from black to white.

Figure 6:
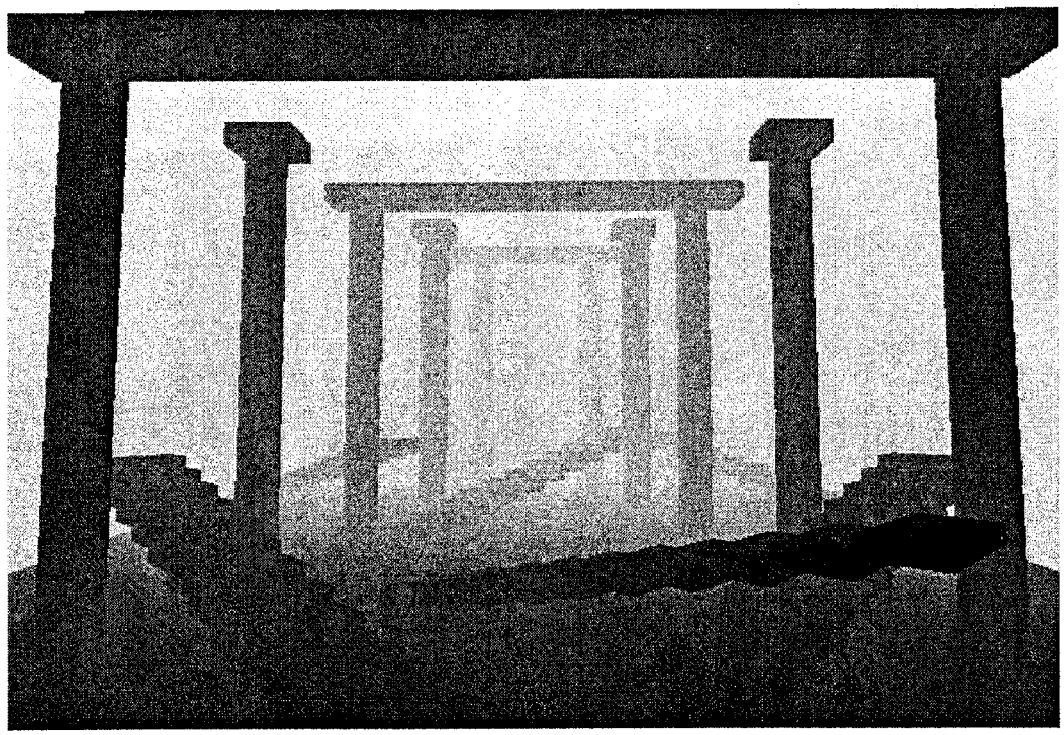
FIG. 6 is a computer display image of the scene from FIG. 1, showing an inverted corresponding z-buffer image.

FIG. 6 is a computer display image of the scene from FIG. 1, showing the inverted 8-bit z-buffer data. In that regard, FIG. 6 is a reverse image of FIG. 2. It should be apparent that, in FIG. 5, objects that are closer to the viewer are shown as black (opaque), while objects that are farther from the viewer are shown as white (transparent). The reverse depth of field data may be useful in showing a changed point of focus for an image and in producing transient effects.

Figure 7:
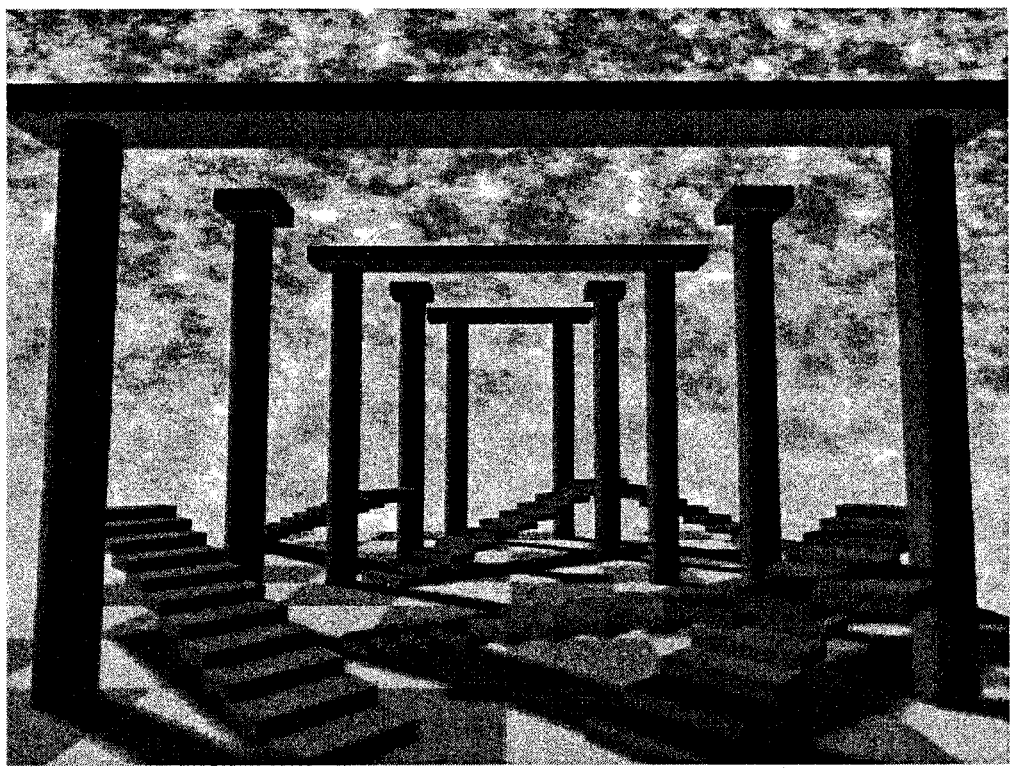
FIG. 7 is a computer display image of the scene from FIG. 1, showing the result of combining the infinitely sharp image of FIG. 1 with the blur image of FIG. 3, and using the inverted z-buffer image data from FIG. 6 as an alpha channel.

FIG. 7 is a computer display image of the scene from FIG. 1, showing the result of combining the sharp image of FIG. 1 with the blur image of FIG. 3, and using the inverted z-buffer image data from FIG. 6 as an alpha channel for compositing to show a changed point of focus. FIG. 7 shows that objects in the foreground (closer to the viewer) are blurred and not distinct, whereas objects in the background (farther from the viewer) are sharp and more distinct. In the sense of focus perspective, FIG. 7 may be characterized as the "opposite" of FIG. 4.

One of the useful effects that can be produced with the reverse z-buffer data is referred to as a "rack focus" effect, in which successive computer images of a scene can be produced using different z-buffer data sets to effectively change the point of focus in a scene image. For example, an infinitely sharp image of a scene such as FIG. 1 may be successively combined with z-buffer data in real time beginning with the z-buffer data for FIG. 2 and ending with the z-buffer data for FIG. 6, as well as intermediate z-buffer data in between.

Figure 8:
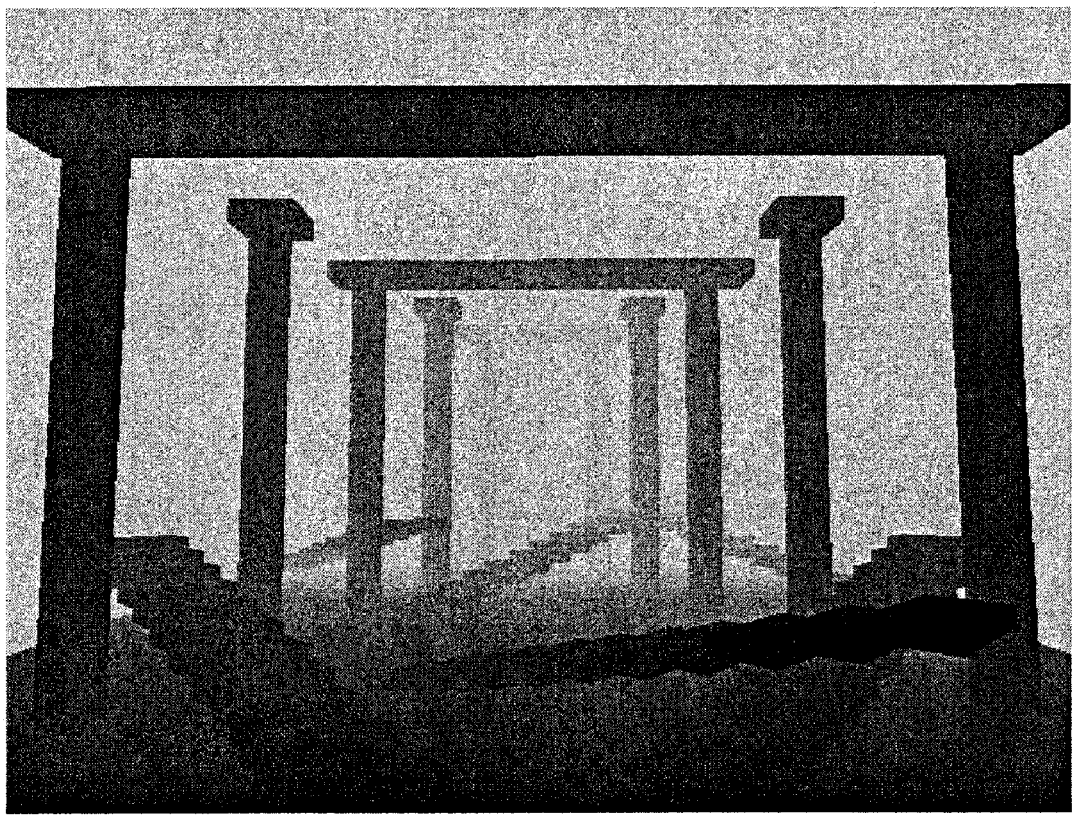
FIG. 8 is an 8-bit z-buffer image that is intermediate between the images of FIG. 2 and FIG. 6.

FIG. 8 shows an intermediate z-buffer image produced from z-buffer data that is intermediate between FIG. 2 and FIG. 6. FIG. 8 effectively creates a reduced contrast image. When the sharp and blur images (FIG. 1 and FIG. 3, respectively) are alpha-blended (composited) with each of the successive z-buffer images from FIG. 2, through FIG. 8, and stopping with FIG. 6 (or vice versa), it will appear to one looking at the sequence of images thereby produced that the focus is changing. That is, a person viewing the successive composited images will "see" a changing point of focus, from front to back in the scene, corresponding to images composited with the z-buffer images from FIG. 2 to FIG. 6. It should be apparent that the point of focus in any one of the successive composited images will correspond to the z-buffer frame of reference (image location) for the particular composited image. Thus, an effect intermediate between FIG. 4 and FIG. 7 may be produced by using intermediate reverse z-buffer data sets such as illustrated by FIG. 8.

Thus, a sequence of composited scene images may be produced using multiple intermediate images such as described above so that the sequence of scene images will smoothly and gradually "walk" the viewer focus from foreground (FIG. 4) to background (FIG. 7), and at points in between. A starting point image (such as FIG. 4) from the z-buffer and an ending point image (such as FIG. 7) from the z-buffer may be used to produce the multiple intermediate composited images at regular graphical intervals to ensure a smooth transition for the viewer. For example, linear interpolation may be used to create the intermediate z-buffer images in uniform intervals between the starting image and the ending image. The sequence of the intermediate z-buffer images will be composited with the sharp and blur images, in turn. Temporary data storage may be used to maintain the pixel data for the multiple intermediate images in processor memory. As noted above, such images may be created in real time, using conventional image processing hardware. Other visual effects may be produced using the teachings of the present invention.

Figure 9:
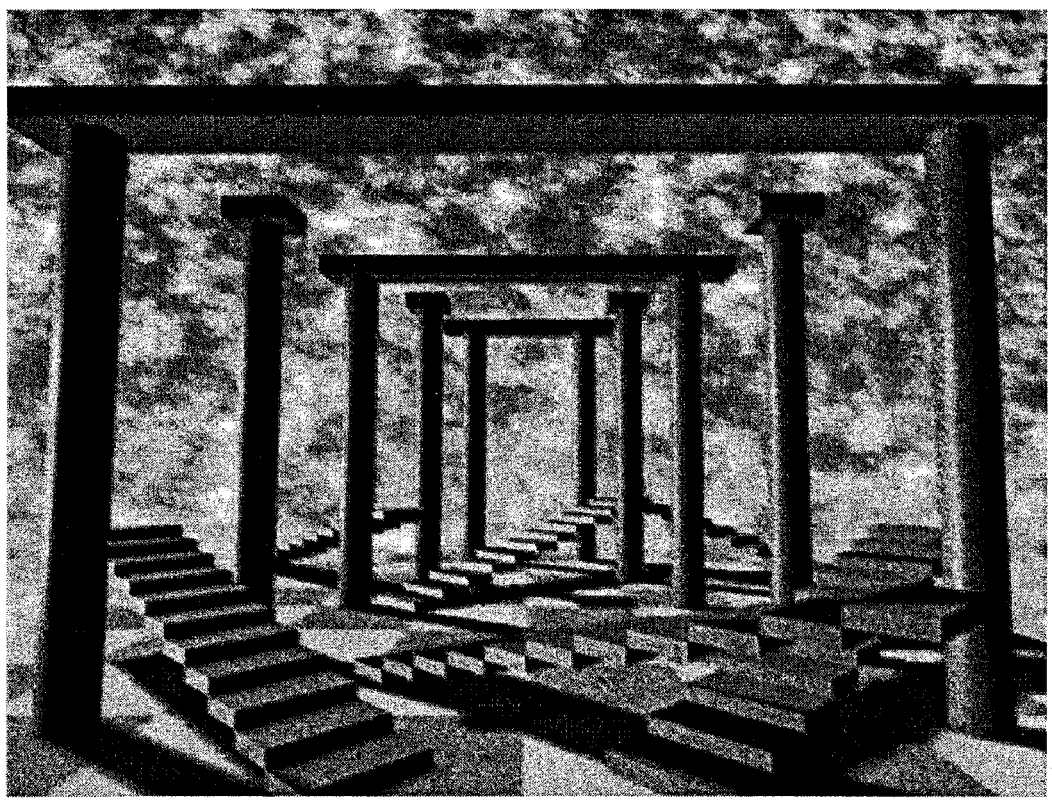
FIG. 9 is a black-and-white (non-color) blur image produced by a color channel copying process in which one color of the blur image from FIG. 3 is copied onto itself to produce the image of FIG. 9.
Figure 10:
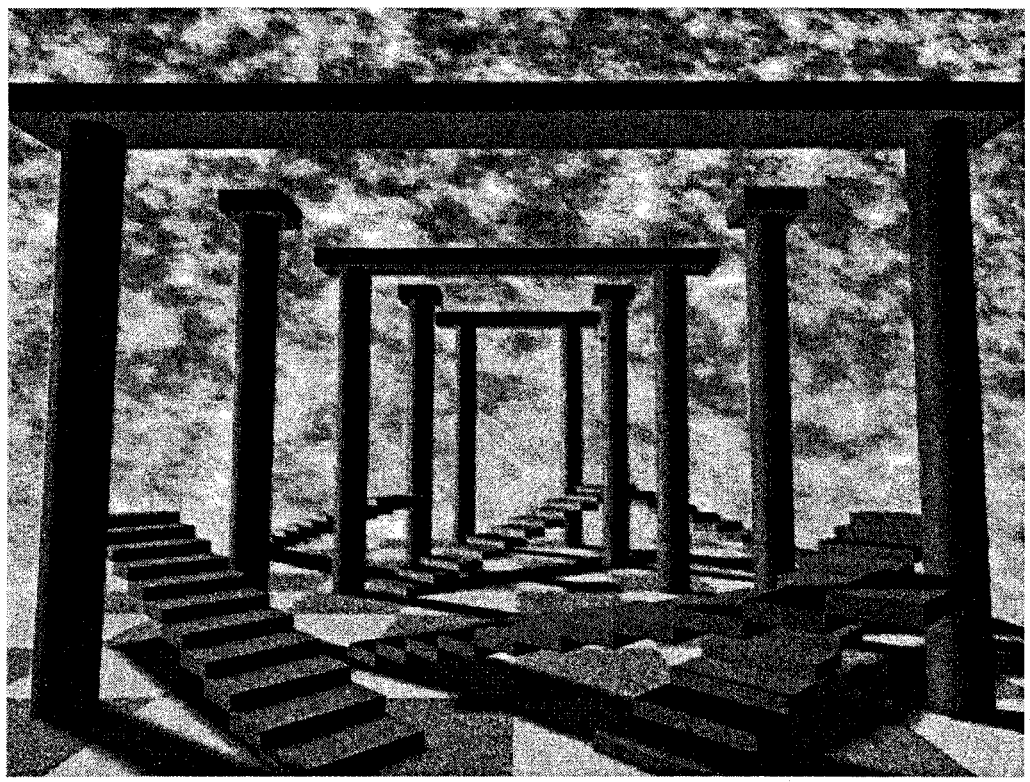
FIG. 10 is a reduced saturation image produced by compositing FIG. 1 with FIG. 9.

Another visual effect that may be produced with the technique of the present invention will provide an image with reduced saturation. For example, the hue of the blue channel for the blur image (such as the blur image shown in FIG. 3) may be shifted toward the blue color spectrum, or to any other color, through a vertex-color manipulation to create an atmospheric haze effect. Those skilled in the art will appreciate how conventional graphics processing systems may be used to perform such a manipulation. Similarly, the red channel data of the blur image may be copied into the green channel data and the blue channel data of the blur image to create a black-and-white blur image. FIG. 9 is an example of a black-and-white blur image produced by such a process. The resulting black-and-white blur image may be alpha-blended with the infinitely sharp image to produce a realistic image that is less saturated in the far areas of the scene. FIG. 10 is an example of a reduced-saturation image that has been produced by alpha-blending an infinitely sharp image such as that of FIG. 1 with a black-and-white blur image such as that of FIG. 9.

Hardware Configuration

A variety of computer configurations with graphics processing capability may be used to provide the improved graphics images described above, in real time. Such configurations include information processing systems, Personal Computers, and video game systems.

The processing described above may use readily available hardware components of a computer graphics processor that composites image data to produce RGBA data and utilizes z-buffer data for hidden surface removal, as described above. In accordance with the invention, the graphics processor operation uses the z-buffer data as an alpha blending channel and thereby permits the processing described above to be performed in real time. The real time processing permits greater flexibility in implementing the image processing as described herein, making it suitable for interactive applications such as game playing. Alternatively, the processing of the invention may be implemented in a combination of hardware and software that is especially suited to perform the image processing described herein.

Figure 11:
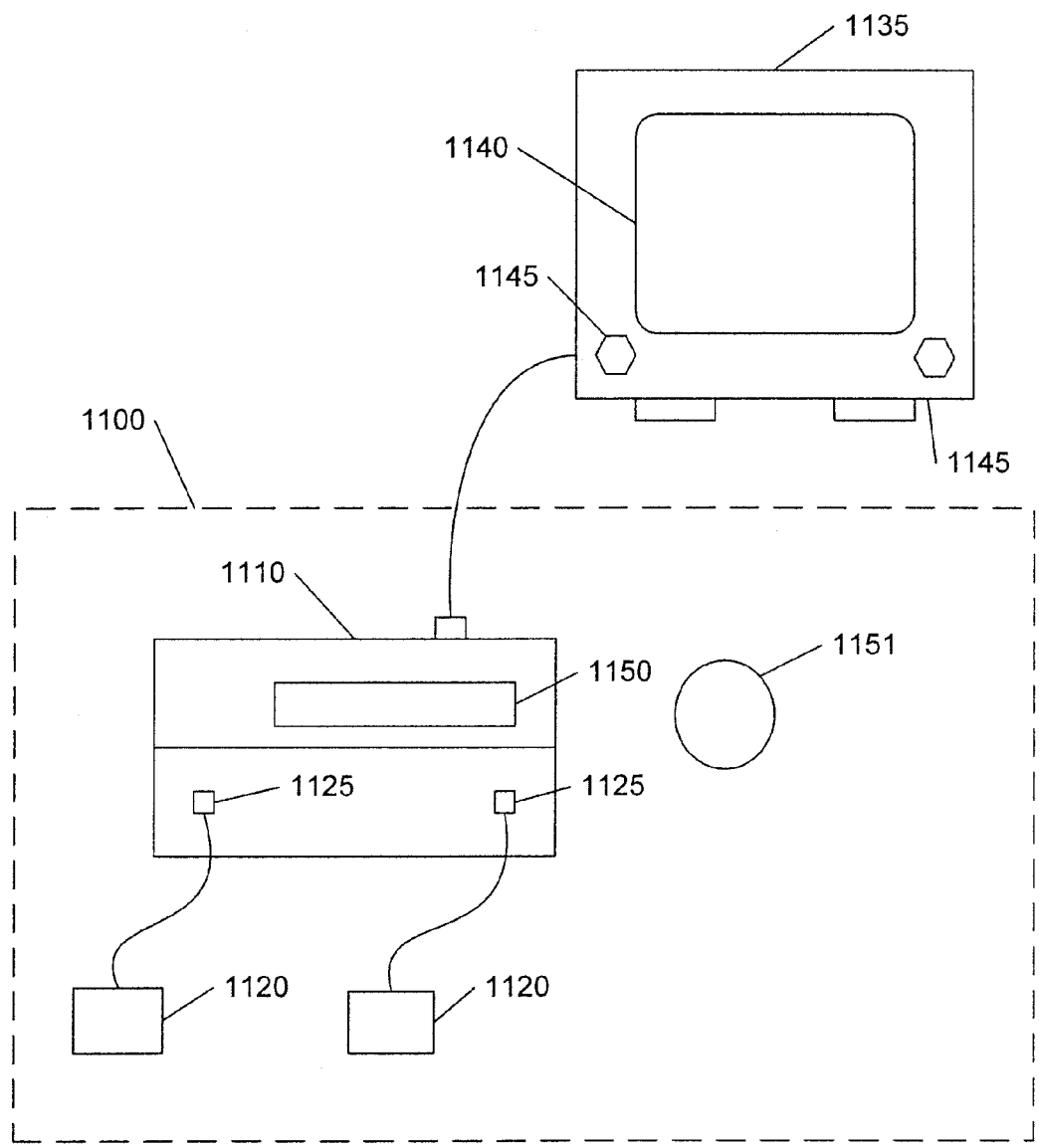
FIG. 11 is a block diagram of a computer system and display with which the images shown in FIGS. 1 through 10 may be produced.

FIG. 11 is a schematic illustration of an information processing or video game system 1100 that provides graphics processing in accordance with the present invention. The video game system 1100 includes a video game main unit 1110 and one or more controllers 1120 that are communicatively coupled to the main unit 1110 via respective controller interfaces 1125 on the main unit 1110. The controllers 1120 each comprise an input device for receiving user instructions.

The video game system 1100 interfaces with an audiovisual (AV) output device 1135 that is communicatively coupled to the main unit 1110. The AV output device 1135 includes a display screen 1140 for displaying image data in accordance with signals received from the main unit 1110. The AV output device 1135 also includes one or more sound speakers 1145 for outputting audio data in accordance with signals received from the main unit 1110.

The main unit includes a program reader 1150 that is configured to receive a game program storage medium, such as such as a magnetic floppy disk, an optical CD-ROM disc, a CD-R disc, a CD-RW disc, a DVD disc, or the like. The game program storage medium is a recording medium for supplying an application program such as a video game to the main unit 1110. The main unit 1110 is configured to process information and execute the program instructions located on the game program storage medium. The main unit 1110 outputs image and sound data to the AV output device 1135 in accordance with the program instructions. The main unit receives user input from the controllers 1120, as described in more detail below.

Figure 12:
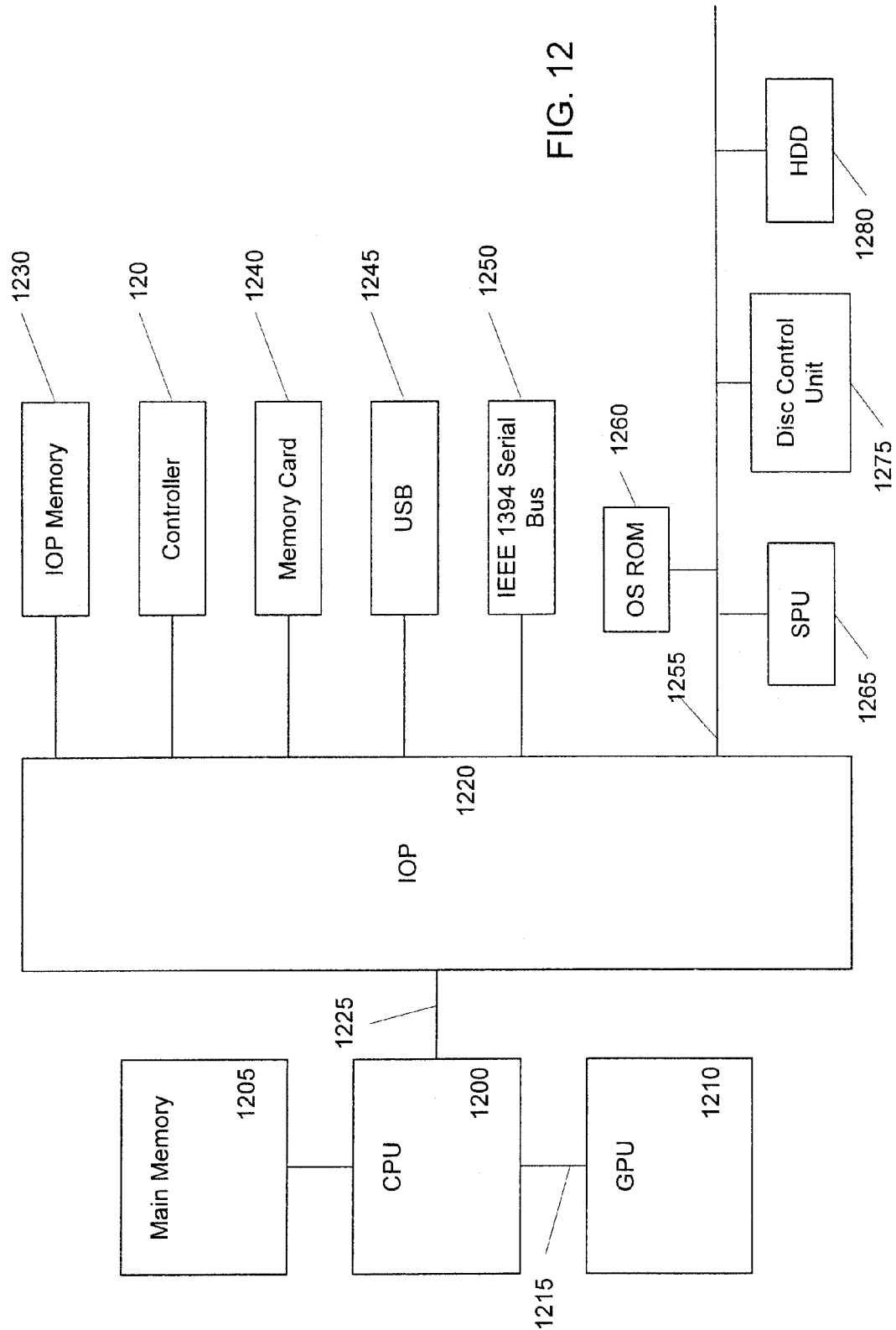
FIG. 12 is a detailed block diagram of the computer system illustrated in FIG. 11.

FIG. 12 is a block diagram of an exemplary hardware configuration of the video game entertainment system shown in FIG. 11. The video game system 1100 (FIG. 11) includes a central processing unit (CPU) 1200 that is associated with a main memory 1205. The CPU 1200 operates under control of programming steps that are stored in the OS-ROM 1260 or that are transferred from a game program storage medium to the main memory 1205. The CPU 1200 is configured to process information and execute instructions in accordance with the programming steps.

The CPU 1200 is communicatively coupled to an input/output processor (IOP) 1220 via a dedicated bus 1225. The IOP 1220 couples the CPU 1200 to the OS ROM 1260, which is comprised of a non-volatile memory that stores program instructions, such as an operating system. The instructions are preferably transferred to the CPU via the IOP 1220 at start-up of the main unit 1110 (FIG. 11).

The CPU 1200 is communicatively coupled to a graphics processing unit (GPU) 1210 via a dedicated bus 1215. The GPU 1210 is a drawing processor that is configured to perform drawing processes and formulate images in accordance with instructions received from the CPU 1200. For example, the GPU 1210 may render a graphics image based on display lists that are generated by and received from the CPU 1200. The GPU may include a buffer for storing graphics data. The GPU 1210 outputs images to the AV output device 1135 (FIG. 11).

The IOP 1220 controls the exchange of data among the CPU 1200 and a plurality of peripheral components in accordance with instructions that are stored in an IOP memory 1230. The peripheral components may include one or more controllers 1120, a memory card 1240, a USB interface 1245, and an IEEE 1394 serial bus 1250. Additionally, a bus 1255 is communicatively coupled to the IOP 1220. The bus 1255 is linked to several additional components, including the OS ROM 1260, a sound processor unit (SPU) 1265, an optical disc control unit 1275, and a hard disk drive (HDD) 1280.

The SPU 1265 is configured to generate sounds, such as music, sound effects, and voices, in accordance with commands received from the CPU 1200 and the IOP 1220. The SPU 1265 may include a sound buffer in which waveform data is stored. The SPU 1265 generates sound signals and transmits the signals to the speakers 1145 (FIG. 11).

The disc control unit 1275 is configured to control the program reader 1150 (FIG. 11), which can comprise, for example, an optical disc drive that accepts removable storage media such as a magnetic floppy disk, an optical CD-ROM disc, a CD-R disc, a CD-RW disc, a DVD disc, or the like.

The memory card 1240 may comprise a storage medium to which the CPU 1200 may write and store data. Preferably, the memory card 1240 can be inserted and removed from the IOP 1220. A user can store or save game data using the memory card 1240. In addition, the video game system 1100 is preferably provided with at least one hard disk drive (HDD) 1280 to which game data may be written and stored. A data I/O interface, such as an IEEE 1394 serial bus 1250 or a universal serial bus (USB) 1245 interface, is preferably communicatively coupled to the IOP 1220 in order to allow data to be transferred into and out of the video game system 1100.

A more detailed description of the image processing system will now be provided, for better understanding of the processing involved with producing display images in accordance with the present invention.

Figure 13:
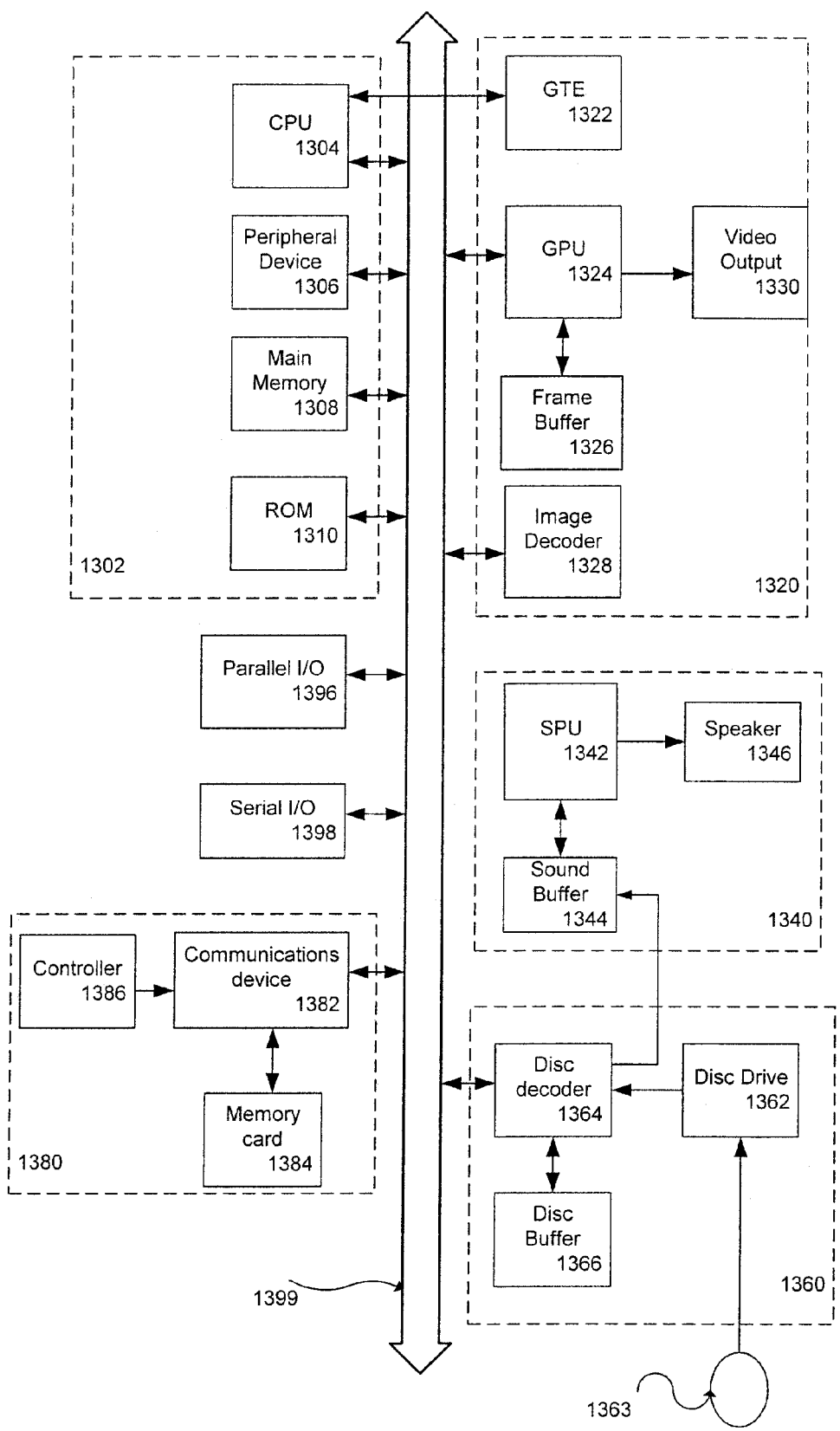
FIG. 13 is a detailed block diagram of an embodiment of a computer system for display of images produced in accordance with the present invention.

FIG. 13 shows an arrangement of the image processing system installed in a home video-game console. The image processing system is substantially designed for use in a home video-game machine, a microcomputer, or a graphic computer apparatus device. The image processing system of the embodiment of FIG. 13 allows an operator to play a game by controlling relevant data (e.g., game programs) retrieved from a recording medium such as an optical disc (e.g., a CD-ROM), which is also designed in accordance the present invention for storage of the data in a specific format.

More specifically, the image processing system of the embodiment shown in FIG. 13 comprises a main controller module 1302 having a central processing unit (CPU) 1304 and its peripheral devices (including a peripheral device controller 1306), a graphics module 1320 composed substantially of a graphics processing unit (GPU) 1324 for drawing an image on a frame buffer 1326, a sound module 1340 comprised of a sound processing unit (SPU) 1342 and other devices for emitting a music or effect sound, an optical disc controller module 1360 for controlling an optical (e.g., CD-ROM) disc drive 1362 that functions as an auxiliary memory means for decoding of reproduced data, a communications controller module 1380 for controlling entry of command signals from a controller 1386, input and output of information on game parameter setting on a sub memory (or a memory card) 1384, and a main bus 1399 connected from the main control module 1302 to the communications controller module 1380.

The main controller module 1302 comprises the CPU 1304, the peripheral device controller 1306 for controlling interrupt actions, time sequences, memory actions, and transmission of a direct memory access (DMA) signal, a main memory 1308 comprised of, for example, two megabytes (2 MB) of RAM, and a ROM 1310 comprised of, for example, 512 kilobytes of memory, in which are stored programs, including an operating system for operating the main memory 1308, the graphics module 1320, and the sound module 1340. The CPU 1304 may be a 32-bit reduced instruction set (RISC) computer for performing the operating system stored in the ROM 1310 to control the entire system. The CPU 1304 also includes a command cache and a scratch pad memory for controlling real storage.

The graphics module 1320 comprises a GTE 1322 having an arithmetic coprocessor for coordinate calculation to perform a coordinate transform process, the GPU 1324 for drawing an image in response to command signals from the CPU 1304, the frame buffer 1326 having, for example, one megabyte (1 MB) of memory for storage of graphics data provided by the GPU 1324, and an image decoder 1328 (referred to as "MDEC" hereinafter) for decoding a coded image data compressed and encoded by an orthogonal transform process such as discrete cosine transforming. The GTE 1322 may have a parallel processor for performing a plurality of arithmetic operations in parallel and acts as a coprocessor for the CPU 1304 to operate high-speed actions for coordinate transforming and calculation of light source, vector, and matrix of fixed decimal point notation processing.

More specifically, the GTE 1322 is capable of performing the coordinate calculation of polygons at typically 1.5 million per second for flat shading where each triangle polygon is drawn in one single color. This allows the image processing system to minimize the load to the CPU 1304 and thus perform the coordinate calculations at a higher speed. The GPU 1324 is responsive to a polygon drawing command from the CPU 1304 for drawing a polygon or graphic to the frame buffer 1326. The GPU 1324 can draw up to 360,000 polygons per second and has a two-dimensional address space independently of the CPU 1304 for mapping of the frame buffer 1326.

The frame buffer 1326 comprises a so-called dual port RAM which performs at the same time a retrieving of drawing data from the GPU 1324 or a transfer of data from the main memory 1308 and a releasing of data for display. Also, the frame buffer 1326 may include memory having a size of one megabyte constituting a pixel matrix of 1024 values in the horizontal by 512 values in the vertical, in 16-bit format. Any desired area in the size of the frame buffer 1326 can be delivered to a video output means 1330 such as a display.

In addition to the area delivered as a video output, the frame buffer 1326 includes a color lookup table (referred to as "CLUT" hereinafter) area, for storage of a CLUT that is used as a reference during drawing of graphics or polygons with the action of the GPU 1324, and a texture area for storage of texture data to be coordinate transformed and mapped on the graphics or polygons drawn by the GPU 1324. Both the CLUT and texture areas can be varied dynamically in size depending on changes of the display area. The frame buffer 1326 can thus execute a drawing access to the area on display and a high-speed DMA transfer to and from the main memory 1308. The GPU 1324 can also perform, in addition to the flat shading, Gouraud shading in which the color of a polygon is determined by interpolation of vertex color, and texture mapping in which a texture selected from the texture area is attached to a polygon. For the Gouraud shading or texture mapping, the GTE 1322 can perform the coordinate calculation at a rate of up to 500,000 polygons per second.

The MDEC 1328 is responsive to a command signal from the CPU 1304 for decoding a still or motion image data retrieved from a CD-ROM disc and stored in the main memory 1308 and subsequently storing it again in the main memory 1308. More particularly, the MDEC 1328 performs a reverse discrete cosine transforming operation (referred to as reverse DCT) at a high speed for expanding compressed data of the color still image compression standard (known as JPEG) or the motion image encoding standard for storage media (known as MPEG, but for intraframe compression in this embodiment). The image data reproduced is transferred via the GPU 1324 to the frame buffer 1326 and can therefore be used as a background for an image drawn by the GPU 1324. The sound module 1340 comprises the sound processor unit (SPU) 1342 responsive to a command from the CPU 1304 for generating a music or effect sound, a sound buffer 1344 having, by way of example and not necessarily by way of limitation, 512 kilobytes for storage of audio data of voice or music sound, sound source data retrieved from a CD-ROM, and a loudspeaker 1346 acting as a sound output means for emitting a music or effect sound generated with the SPU 1342.

The SPU 1342 has an adaptive differential pulse code modulation (ADPCM) signal decoding function for reproducing an audio data of 4-bit ADPCM format converted from 16-bit audio data, a playback function for reproducing the sound source data stored in the sound buffer 1344 to emit a music or effect sound, and a modulating function for modulating the audio data stored in the sound buffer 1344 for playback. More specifically, the SPU 1342 has an ADPCM sound source with 24-voices in which motion parameters of looping and time coefficients are automatically modified and which is actuated by a signal from the CPU 1304. The SPU 1342 controls its address space mapped with the sound buffer 1344 and can perform the reproduction of audio data by direct transmission of ADPCM data with information of key-on/key-off or modulation from the CPU 1304 to the sound buffer 1344. Accordingly, the sound module 1340 is used as a sampling sound source for generating a music or effect sound corresponding to the audio data stored in the sound buffer 1344 upon receiving a command signal from the CPU 1304.

The optical disc controller module 1360 comprises the disk drive 1362 for retrieving a program or data from an optical disc or CD-ROM 1363, a disc decoder 1364 for decoding an encoded, stored program or data accompanied with error correction codes (ECC), and a disc buffer 1366 of, for example, 32 kilobytes (32 KB) for storage of data retrieved from the optical disc. The optical disc controller module 1360 comprised of the disk drive 1362, decoder 1364, and other components for reading data from a disc (and optionally, writing to the disc) is also arranged to support other disc formats, including CD-DA and CD-ROM XA. The decoder 1364 also serves as a member of the sound module 1340. Other formats and media may also be supported by the disc drive subsystem 1360, such as DVD-ROM, floppy disk, and the like.

The audio data retrieved by the disc drive 1362 from the disc is not limited to the ADPCM format (for storage on CD-ROM XA discs) but may be of a common PCM mode produced by analog-to-digital conversion. The ADPCM data may be recorded in 4-bit differential form calculated from 16-bit digital data and is first subjected to error correction and decoding in the decoder 1364, transmitted to the SPU 1342 where it is D/A converted, and supplied to the loudspeaker 1346 for playback. The PCM data may be recorded in 16-bit digital signal form and is decoded by the decoder 1364 for driving the loudspeaker 1346. An audio output of the decoder 1364 is first sent to the SPU 1342 where it is mixed with an SPU output and released through a reverberation unit for audio playback.

The communications controller module 1380 comprises a communications controller device 1382 for controlling communications along the main bus 1399 with the CPU 1304, the controller 1386 for entry of commands by an operator, and the memory card 1384 for storage of game setting data. The controller 1386 provides an interface for transmitting instructions of the operator to application software and may include command keys for entry of the instructions by the user. Commands attributed to the command keys, as predetermined by the communications controller device 1382, are provided to the communications controller device 1382 in synchronous mode at a speed of sixty times per second. The communications controller device 1382 then transmits the key commands to the CPU 1304.

The controller 1386 has two connectors arranged thereon for connection of a number of the controllers one after another through multi-tap ports. Accordingly, upon receiving the command from the operator, the CPU 1304 starts performing a corresponding process action determined by a game program. When the initial setting on a game to be played is requested, the CPU 1304 transfers relevant data to the communications controller device 1382 which, in turn, stores the data in the memory card 1384. The memory card 1384 is separated from the main bus 1399 and can be freely installed or removed while the main bus is being energized. This will allow data of the game setting to be stored in two or more of the memory cards 1384.

The system of this embodiment of the present invention is also provided with a 16-bit parallel input and output (I/O) port 1396 and an asynchronous serial input and output (I/O) port 1398. The system can be connected at the parallel I/O port 1396 to any other peripheral device and at the serial I/O port 1398 to another video game machine for communications.

Between the main memory 1308, the GPU 1324, the MDEC 1328, and the decoder 1364, it is required to transfer at a high speed huge amounts of the image data for reading a program, displaying a text, or drawing a graphic. The image processing system of this embodiment is thus adapted for allowing direct data transfer or DMA transfer between the main memory 1308, the GPU 1324, the MDEC 1328, and the decoder 1364 without using the CPU 1304. Rather, the data transfer is performed under the control of the peripheral device controller 1306. As a result, the load to the CPU 1304 during the data transfer will be considerably reduced, thus ensuring high-speed data transfer operations.

The video game machine constructed in accordance with the present invention permits the CPU 1304 to execute the operating system stored in the OS ROM 1310 upon being launched. As the operating system is executed, the actions of the graphic module 1320 and the sound module 1340 are correctly controlled by the CPU 1304. In addition, upon the operating system being invoked, the CPU 1304 starts initializing the entire system by reviewing each action and then by actuating the optical disc controller module 1360 for performing a desired game program stored on an optical disc. During execution of the game program, the CPU 1304 actuates the graphic module 1320 and the sound module 1340 in response to command inputs by the operator for controlling display of images and reproduction of music or effect sounds. The representation of image data on the display by the image data processing apparatus of the present invention is next explained. The GPU 1324 displays the area of a desired graphic model produced by the frame buffer 1326 on the video output means 1330 or display, for example, such as a CRT or flat panel display device. The area is referred to hereinafter as a display area. The graphic model corresponds to the coordinate space or virtual world within which the objects in the scene are placed, and may be generated by a modeling program such as the "Maya" product from Alias|Wavefront of Toronto, Ontario, Canada, or the "3D Studio Max" product from the "Discreet" division (in Montreal, Quebec, Canada) of Autodesk, Inc., or other suitable drawing or graphics application program for scene generation.

Figure 14:
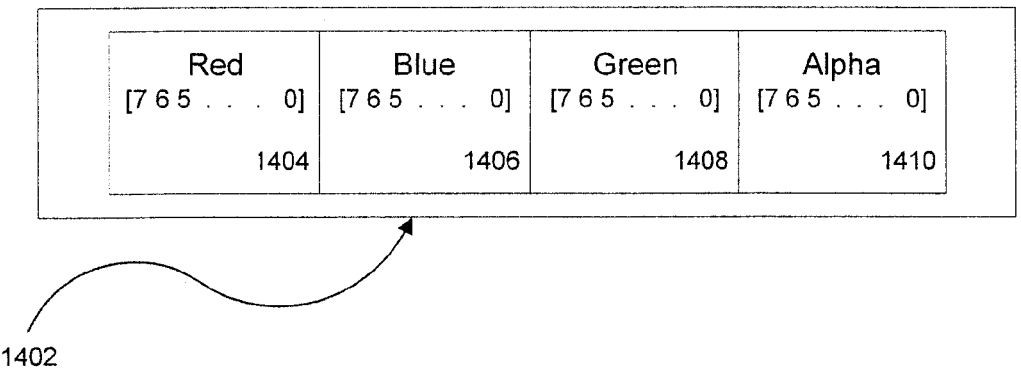
FIG. 14 is an illustration of an example display device pixel of a computer system constructed in accordance with the present invention, such as the systems shown in FIGS. 11, 12, and 13.

FIG. 14 illustrates data of an exemplary pixel 1402 for an RGBA multispectral color model display. The pixel 1402 stores information from four different data channels. In the RGBA color model, these four channels comprise red 1404, green 1406, blue 1408, and alpha 1410. The FIG. 14 representation of each data channel includes the notation "[7, 6, 5, . . . , 0]" to indicate that each of the four data channels for a pixel is comprised of eight bits of information, with the most significant bit (bit 7) to the left of the illustration and the least significant bit (bit 0) to the right. Other data word sizes for the pixel information may be used. The red 1404, blue 1406, green 1408, and alpha channel data 1410 for each pixel 1402 in a display scene are stored in the frame buffer 1326 (FIG. 13).

Thus, the red 1404, green 1406, and blue 1408 channels, comprising eight bits each, provide image color information. Any color portion of a pixel image can be represented by the combination of red channel 1404, green channel 1406, and blue channel 1408 data. The alpha channel 1410, also comprising eight bits, represents the opacity of the corresponding pixel image, ranging from opaque to transparent. Accordingly, each pixel 1402 is stored in the frame buffer as a combination of these four channels, for any RGBA color model system.

Figure 15:
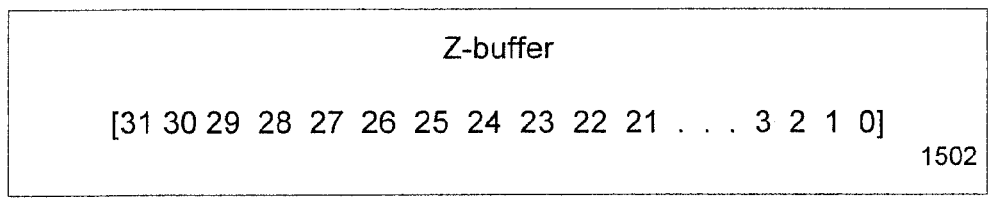
FIG. 15 is a representation of a single z-buffer entry of the computer systems such as illustrated in FIGS. 11, 12, and 13.

FIG. 15 is a representation of a single entry 1502 from the z-buffer. In the preferred embodiment, the z-buffer is part of the image processing system depicted alternatively as a game console 1110 (FIG. 11), computer processor system (FIG. 12), or image processor (FIG. 13). The z-buffer is used for hidden surface removal and corresponds to position location for an object being depicted in the display scene. Thus, the data word size of the z-buffer pixel information is typically the same data word size as the data used for position calculations performed by the image processing system. In the preferred embodiment, the z-buffer contains data words of 32-bit size. This is illustrated in the z-buffer 1502 of FIG. 15 by the notation "[31 30 29 28 27 26 25 24 23 22 21 . . . 3 2 1 0]".

As noted above, each pixel that is to be drawn on the computer display is associated with a corresponding data entry in the z-buffer. FIG. 15 is a representation of the z-buffer data entry for one of those pixels. In accordance with the invention, data from the z-buffer is alpha-blended (composited) with the color pixel information from the frame buffer on a pixel-by-pixel basis. Because the z-buffer information has a 32-bit word size, while the pixel information for each channel is of 8-bit word size, the processing in accordance with the present invention truncates the z-buffer information so that only an 8-bit data word from the z-buffer is composited with each of the 8-bit pixel words of the RGBA image information from the frame buffer. In the preferred embodiment, the eight most significant bits (MSB) from each z-buffer pixel are composited with each corresponding pixel of information from the frame buffer.

Figure 16:
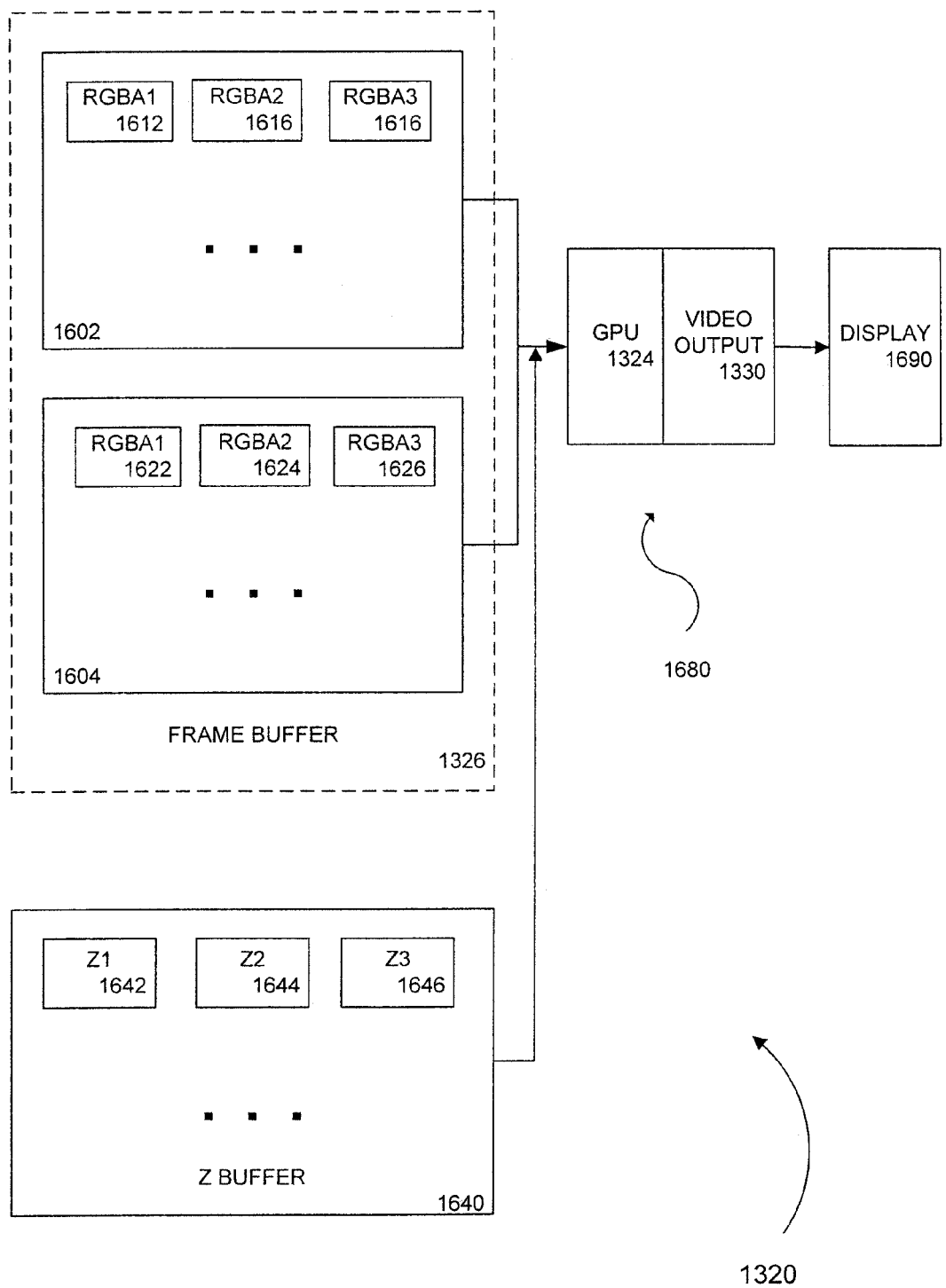
FIG. 16 is a representation of the frame buffer environment for the display devices of the computer systems illustrated in FIGS. 11, 12, and 13.

FIG. 16 illustrates an exemplary frame buffer environment. As shown in FIG. 16, in the preferred embodiment, a frame buffer (such as the frame buffer 1326 illustrated in FIG. 13) stores more than one frame of image data. In particular, FIG. 16 shows that the frame buffer 1326 includes data storage for a first frame data array 1602 and for a second frame data array 1604. Such an arrangement is typically used to display successive frames for video display, such as with interlaced display devices. The first frame array 1602 comprises numerous pixels, of which pixels 1612, 1614 and 1616 are shown. Similarly, the second frame array 1604 includes pixels 1622, 1624, 1626. Each of these frame arrays can store an entire image at any given time, and comprise a plurality of memory locations in the graphics processor machine.

The frame arrays 1602, 1604 of the frame buffer 1326 are connected to a hardware scan-out device 1680, such as a device comprising the GPU 1324 and video output 1330 described previously in connection with the system of FIG. 13. The scan-out device selectively reads the pixel information from one of the frame buffer arrays 1602, 1604 and transmits it to the display 1690 for physical display. The pixels comprising the frame buffer array being displayed are referred to as the on-screen image, whereas the pixels of the frame buffer array not being displayed are referred to as the off-screen image. The frame buffer arrays 1602, 1604 can also store pixel information transmitted from other regions of memory or can write pixel information to other regions of memory.

Processing

Figure 17:
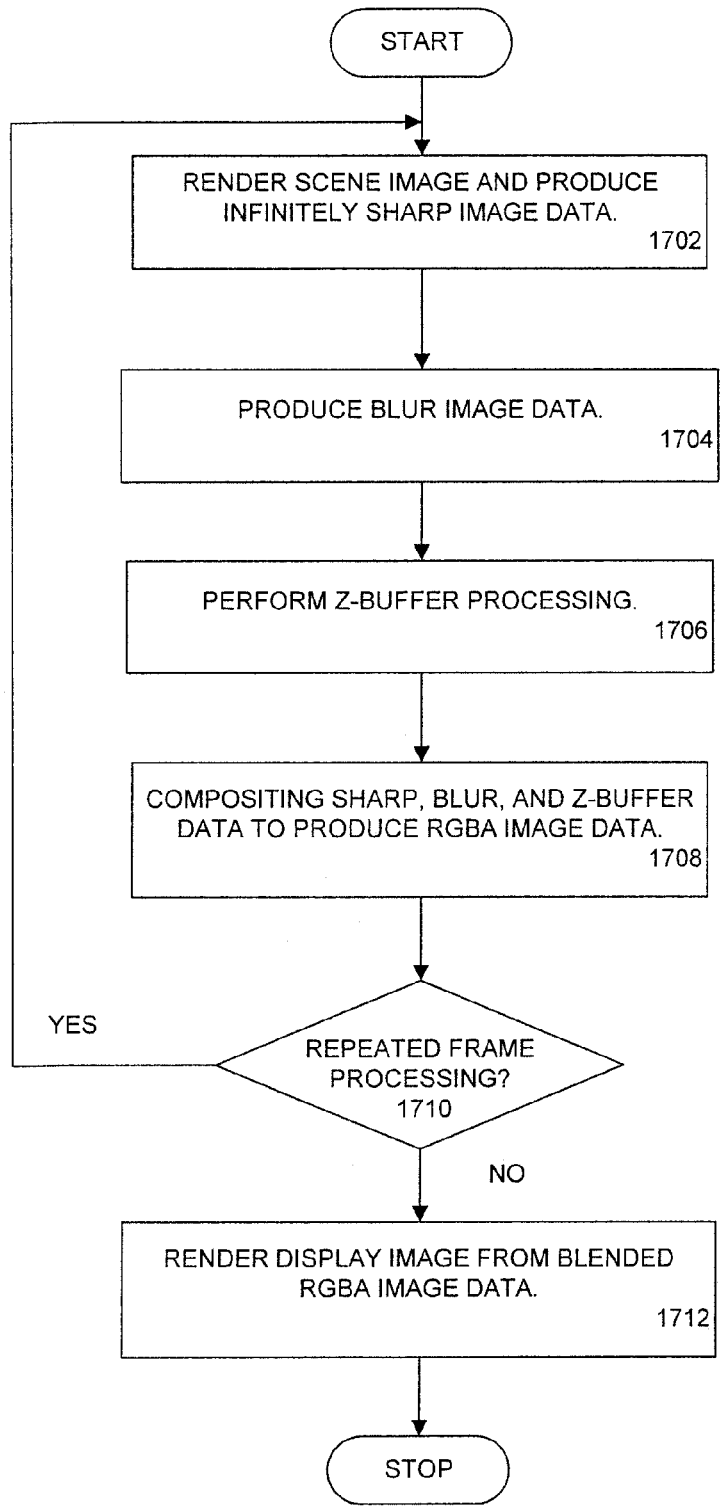
FIG. 17 is a flow diagram that shows the processing performed by the computer systems of FIGS. 11–13 to produce the images with enhanced depth of field information in accordance with the present invention.

FIG. 17 is a flow diagram that shows the processing performed by the image processing systems illustrated in FIGS. 11–13 to produce the images with enhanced depth of field information as illustrated above. In the first processing operation, represented by the flow diagram box numbered 1702, the image processing system produces the infinitely sharp image data for the scene to be processed, wherein the scene depicts objects located in a coordinate (spatial) system. The sharp image may be rendered through a conventional rendering engine. The data for the sharp image of the scene may be created from a conventional three-dimensional (3-D) modeling program, such as the "Maya" product from Alias|Wavefront of Toronto, Ontario, Canada, or the "3D Studio Max" product from the "Discreet" division (in Montreal, Quebec, Canada) of Autodesk, Inc., or will otherwise be received into the graphics image processing system. The rendering software will inherently produce the z-buffer data for the depicted objects.

In the next processing operation, shown as the FIG. 17 box numbered 1704, the system produces the blur image data. As noted above, this operation can be performed by copying a frame image onto itself with a one-pixel offset and 50% transparency or alternative schemes may be used as desired. The blur image data may be stored in temporary data storage or registers of the graphics processor or of associated computing equipment. In accordance with the invention, the blur image is obtained from the sharp image. As described above, the image processing system can receive as input the sharp image data and, from that starting point, the system can produce the blur image using a pixel shifting operation in which the sharp image is copied onto itself, preferably with an opacity of 50%, after shifting one pixel in the horizontal direction and shifting one pixel in the vertical direction. The blur image may be temporarily stored in storage of the graphics processing system. For example, in the two-image frame buffer illustrated in FIG. 16, one image store may be used for the blur image and the other image store may be used for the sharp image.

The next operation (box 1706) is to obtain the truncated z-buffer data. As explained above, most conventional graphics processing systems with a rendering software routinely produce z-buffer data for the purpose of hidden surface removal, with an accuracy that is commensurate with position processing for the objects in a simulated scene. Thus, the z-buffer data should be readily available from most conventional image processors that might be used in accordance with the present invention. More particularly, it should be noted that when the modeling program produces the image data, the program produces the infinitely sharp image and necessarily generates the z-buffer data.

The z-buffer data is processed to ensure that it can be accurately composited with the pixel data in the frame buffer. In the preferred embodiment, the z-buffer data is truncated so that the number of data bits in each pixel of the z-buffer is the same number of data bits as in the pixels of the frame buffer. Thus, in the embodiments described above, the red, blue, and green pixels are represented by 8-bit words, whereas the z-buffer data is represented by 32-bit words for each pixel. Therefore, only the eight most significant bits of each pixel in the z-buffer are composited with the sharp and blur image data. This truncation processing, represented by the box 1706, may be performed by temporarily storing the truncated data in storage of the graphics processing system.

The next operation is for the computer system to perform a compositing process, typically referred to as alpha blending, that composites the sharp image, blur image, and z-buffer data to produce the RGBA image data that will produce an image with depth of field information upon rendering. This compositing operation is represented by the flow diagram box numbered 1708. As noted above, the compositing of image data (alpha blending) is routinely performed by conventional graphics processing computer systems. Such systems, however, perform such compositing with color image data (e.g., red, blue, and green) and alpha channel data that indicates opacity of image elements; they do not composite sharp image, blur image, and z-buffer data.

In addition, the conventional alpha blending involves color image data and alpha channel image data that are of equal data word size, typically the same word size as contained in the frame buffer. In contrast, the z-buffer data of a graphics processor system is maintained with an accuracy that is commensurate with position processing for objects in a simulated scene. Therefore, in the preferred embodiment of the invention, the compositing operation utilizes data from the z-buffer that has been truncated to a compatible number of bits, as described for box 1706. With the teaching of the present invention to perform frame buffer compositing with truncated z-buffer data, those skilled in the art will understand how to achieve the proper processing to produce the RGBA image data that provides depth of field information for enhanced realism upon rendering.

In the next operation at the decision box 1710, the system optionally checks for repeated processing, such as would be performed to produce rack focus effects, atmospheric visual effects, and the like. The additional processing may involve producing an inverted z-buffer image, for example. The additional processing may include temporary storage of image data, such as temporarily storing pixel information for intermediate frames. If repeated processing is desired, an affirmative outcome at the decision box 1710, then system processing returns to box 1702 to produce the next required set of sharp image, blur image, and z-buffer processing. If no additional frame processing for the RGBA image is required, a negative outcome at the box 1710, then processing continues with rendering of the display image at box 1712. The rendering operation may involve a simple rendering operation that produces an image on a computer display device, or the rendering operation may involve any of the supplemental processing operations described above. For example, the rendering processing 1712 may include changing the hue of one color channel, or other processing for special visual effects. All such operations can be performed in real time, so that the enhanced realism images described herein with depth of field information can be produced from sharp image data in real time.

The present invention has been described above in terms of a presently preferred embodiment so that an understanding of the present invention can be conveyed. There are, however, many configurations for computer graphics processing systems not specifically described herein but with which the present invention is applicable. The present invention should therefore not be seen as limited to the particular embodiments described herein, but rather, it should be understood that the present invention has wide applicability with respect to computer graphics processing systems generally. All modifications, variations, or equivalent arrangements and implementations that are within the scope of the attached claims should therefore be considered within the scope of the invention.

What is claimed is:

1. A method of producing a computer display image, the method comprising:
    obtaining a sharp image of a scene;
    producing a blur image of the scene; and
    generating a composited blend image of the sharp and blur images and z-dimension image data;
    producing a sequence of images generated as is the composited blend image to provide a rack focus effect that appears to shift image focus between foreground of the scene and background of the scene;
    wherein the composited blend image has depth of field information when rendered for presentation on a display device along with the sequence of images.

2. A method as defined in claim 1, wherein the blur image comprises pixel-shifted color channel image data of the sharp image.

3. A method as defined in claim 2, wherein the z-dimension image data comprises truncated z pixel information that specifies pixel location data for the scene.

4. A method as defined in claim 3, wherein the truncated z pixel information comprises a predetermined number of the most significant bits for each pixel of the z-dimension image data.

5. A method as defined in claim 1, wherein each image of the sequence is produced by:
    producing an alpha channel RGBA image by compositing the sharp image of the scene with a blur image of the scene with z-dimension image data;
    producing an inverted alpha channel RGBA image by compositing the sharp image of the scene with a blur image of the scene with inverted z-dimension image data; and
        blending the inverted alpha channel RGBA image with the alpha channel RGBA image.

6. A method as defined in claim 1, further comprising changing the blur image hue to a desired color value and using the changed blur image as the source of the z-dimension image data to produce the composited blend image.

7. A method as defined in claim 6, wherein the blur image hue is changed to a blue color value to produce an alpha channel RGBA image with an atmospheric effect.

8. A method as defined in claim 6, wherein changing the blur image comprises:
    copying red channel data of the blur image onto green channel data of the blur image and copying the red channel data of the blur image onto blue channel data of the blur image to thereby produce a black-and-white blur image;
    storing the black-and-white blur image in a z-buffer temporary data store of the scene; and
    combining the data of the blur image in the z-buffer temporary data store with the sharp image to produce the composited blend image.

9. A method as defined in claim 1, wherein the composited blend image is an RGBA image.

10. A method as defined in claim 1, wherein generating the composited blend image of the sharp and blur images and z-dimension image data implements an alpha channel blending process that utilizes the z-dimension image.

11. A method for processing video image data for display during interactive game play, comprising:
    during a game play session, processing one or more images of the game play session to adjust scene representation of objects at a first distance relative to objects at a second distance, during the game play session, performing the following operations,
    (a) generating a sharp image for a scene;
    (b) producing a blur image of the scene; and
    (c) generating a composited blend image of the sharp and blur images using data from z-dimension image data, where the composited blend image has depth of field information provided by the z-dimension image data; and
    (d) rendering the scene for display during the interactive game play; and
    (e) repeating (a)–(d) for two or more images during the game play session, and the two or more images providing a rack focus effect that appears to shift image focus between foreground of the scene and background of the scene.

12. A method for processing video image data for display during interactive game play as recited in claim 11, wherein the objects at the first distance are closer objects having a shaper representation and objects at the second distance are further objects having a more blurred representation.

13. A method for processing video image data for display during interactive game play as recited in claim 12, further comprising,
    determining continuously during game play when objects are in the first distance or the second distance and adjusting the representation of sharper or blurred depending on location or movement of the objects.

14. A method for processing video image data for display during interactive game play as recited in claim 13, wherein the adjusting of the representation of sharper or blurred is gradual as objects move between the first distance and the second distance.

15. A computer implemented method embodiment on a computer readable media, the computer implemented method being for processing video image data for display during interactive game play, comprising:
    during a game play session, processing one or more images of the game play session to adjust scene representation of objects at a first distance relative to objects at a second distance, during the game play session, performing the following operations,
    (a) generating a sharp image for a scene;
    (b) producing a blur image of the scene; and
    (c) generating a composited blend image of the sharp and blur images using data from z-dimension image data, the composited blend image has depth of field information provided by the z-dimension image data, and the generating of the composited blend image of the sharp and blur images and z-dimens ion image data implements an alpha channel blending process that utilizes the z-dimension image; and (d) rendering the scene for display during the interactive game play; and (e) repeating (a)–(d) for two or more images during the game play session, and the two or more images providing a rack focus effect that appears to shift image focus between foreground of the scene and background of the scene.

16. A method for processing video image data for display during interactive game play as recited in claim 15, wherein the objects at the first distance are closer objects having a shaper representation and objects at the second distance are further objects having a more blurred representation.

17. A method for processing video image data for display during interactive game play as recited in claim 16, further comprising, determining continuously during game play when objects are in the first distance or the second distance and adjusting the representation of sharper or blurred depending on location or movement of the objects.

18. A method for processing video image data for display during interactive game play as recited in claim 17, wherein the adjusting of the representation of sharper or blurred is gradual as objects move between the first distance and the second distance.

* * * * *